United States Patent

[11] 3,604,891

[72] Inventor  Milton S. Cohen
              41 Scituate St., Arlington, Mass. 02174
[21] Appl. No. 820,934
[22] Filed     May 1, 1969
[45] Patented  Sept. 14, 1971

[54] ELECTROLYTIC HEATING
     20 Claims, 3 Drawing Figs.

[52] U.S. Cl. .................................................. 219/200,
                                              219/293, 219/385
[51] Int. Cl. ............................................... H05b 1/00
[50] Field of Search ................................... 219/280–286,
                              200, 201, 385–387; 204/146, 143;
                                                    99/171, 174

[56]                  References Cited
                 UNITED STATES PATENTS
     421,499   2/1890  Hubinger .......................  219/293

| 1,098,338 | 5/1914  | Thompson ................ | 204/146 UX |
| 1,985,623 | 12/1934 | Ross ............................. | 219/288 X |
| 2,655,473 | 10/1953 | Lowenheim ................ | 204/146 X |
| 2,739,112 | 3/1956  | Ferguson ..................... | 204/146 X |
| 2,783,355 | 2/1957  | Vassiliev ..................... | 219/293 |
| 3,020,385 | 2/1962  | Conlin et al. ................ | 219/295 X |
| 3,062,663 | 11/1962 | Furgal et al. ................. | 99/174 X |
| 3,483,358 | 12/1969 | Eisler ............................ | 219/385 |
| 2,879,367 | 3/1959  | McLean ....................... | 219/385 |

Primary Examiner—J. V. Truhe
Assistant Examiner—C. L. Albritton
Attorney—W. R. Hulbert ABSTRACT: Heating an electrolytic solution by placing at least three spaced electrodes in direct contact with the solution and connecting two of the electrodes to a source of power to cause electrical current to pass between the two electrodes along a path including the solution and the third electrode.

PATENTED SEP 14 1971

3,604,891

ELECTROLYTIC HEATING

This invention relates to electrolytic heating.

It is a primary object of the present invention to provide a method and apparatus for decreasing the time required to heat an electrolytic solution to a desired temperature condition without increasing the size or number of electrodes connected directly to a current source. Other objects include providing such a method and apparatus in which, without change in or adjustment to the current source, high current is initially passed through the solution to heat it to a desired temperature condition and the current level is then automatically decreased to that required to maintain the solution at the desired condition.

The invention features, in one aspect, a pair of spaced primary electrodes adapted for connection to a source of electrical power and at least one secondary electrode, the primary and secondary electrodes being adapted for directly contacting an electrolytic solution and the solution providing the sole electrical connection between the primary electrodes and the secondary electrodes. In preferred embodiments, this aspect of the invention features a plurality of secondary electrodes each of which are of material of higher negative electromotive potential and of substantially less thickness than the primary electrodes and which are eroded by the passage of electrical current through the solution. In another aspect, the invention features heating an electrolytic solution by placing at least three spaced electrodes in direct contact with the solution and connecting two of the electrodes to a source of power to cause electrical current to pass between the two electrodes along a path including the solution and the third electrode. Preferred embodiments of this aspect of the invention further feature effectively withdrawing the third electrode from the solution after the solution has been heated to a desired condition, automatically decreasing the level of current passing through the solution.

Other objects, features and advantages will become apparent from the following detailed description of a preferred embodiment of the invention, taken together with the attached drawings, in which.

Figures 1, 2, 3:
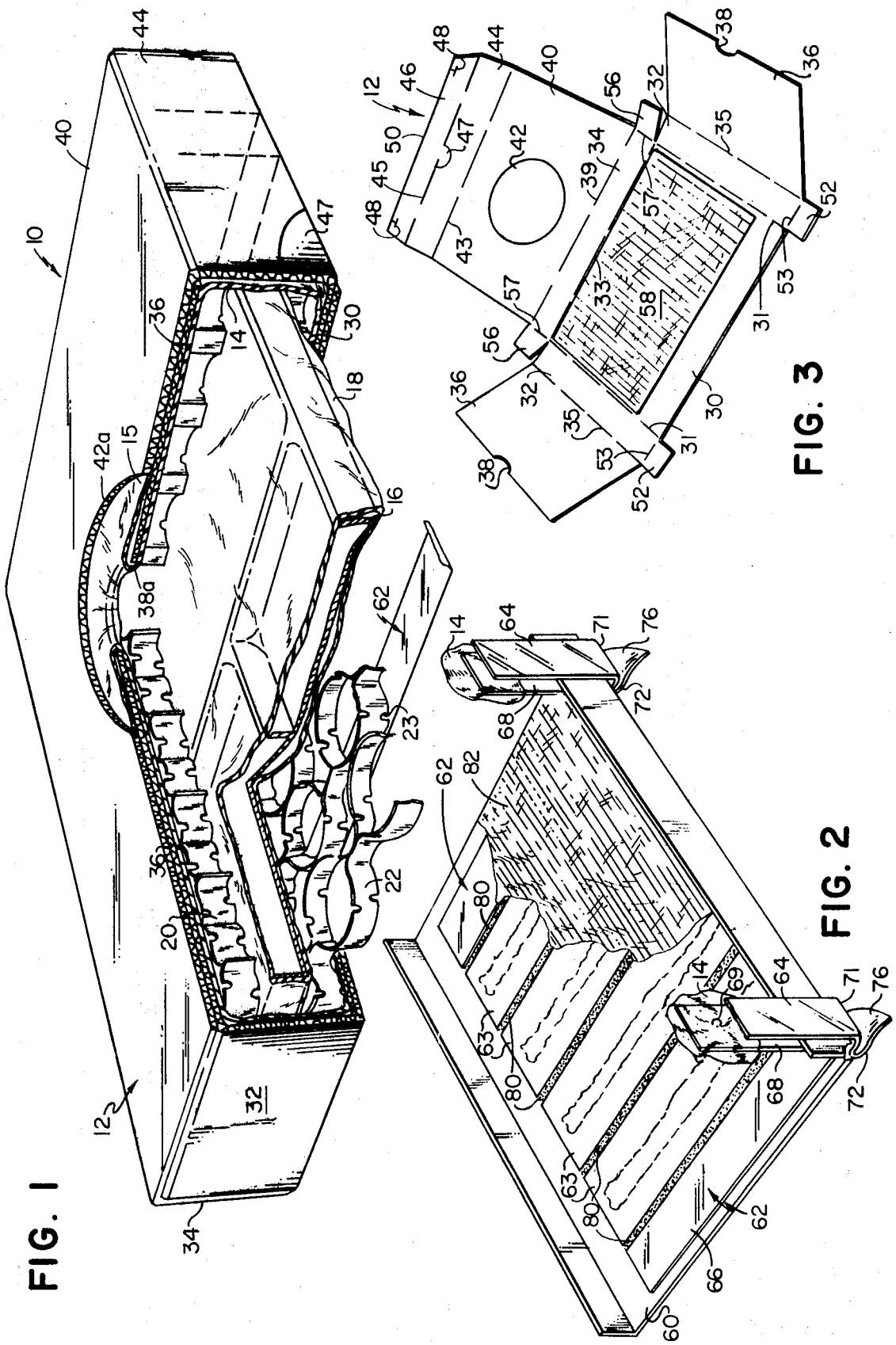
FIG. 1 is a perspective view, partially in section, of a food package embodying the electrolyte heating system present invention.
FIG. 2 is a perspective view of the heating assembly of the food package of FIG. 1; and, FIG. 3 is a perspective view of a box blank used in the food package of FIG. 1.

Referring more particularly to the drawings there is shown a food package, indicated generally at 10, including a container comprising an outer sheet 12 of 200-lb.-test corrugated paperboard folded into a box of 8 inches by 10 inches by 2 inches interior dimensions, a standard (9 inch by 7 inch) frozen-dinner-size food tray 16 enclosed in a sealed electrically insulating polyethylene sheet 18, an electrically insulating polyethylene sheet 14, 0.002 inch thick and (with trimmed corners) 1 yard square, gathered about all internal parts of the package, including food tray 16, and defining the interior surface of the container, and a pair of identical ½-inch-high spacers 20, 22, each made of a network of interconnected strips of paperboard having flow communicating openings 23 therethrough, disposed between polyethylene sheets 14 and 18, respectively, above and below food tray 16.

Referring to FIGS. 1 and 3, box blank 12 (which provides structural strength and c insulation for the package during both storage and heating) includes a bottom panel 30, a first pair of side panels 32 secured to opposite transverse edges of bottom panel 30 along fold lines 31, and a third side panel 34 secured to a longitudinal edge of bottom panel 30 along a fold line 33 perpendicular to fold lines 31. An interior top half panel 36 is secured to each of side panels 32 along a fold line 35 parallel to fold lines 31. The portion of each half panel 36 opposite its fold line 35 includes a semicircular notch 38 which cooperates with the notch 38 on the other top half panel upon folding of the blank (FIG. 1) to form a 1½-inch-diameter opening 38a. An exterior top panel 40 secured to side panel 34 along a fold line 39 includes a precut 3-inch in diameter circular portion 42 which is removed when the package is to be heated to expose a circular opening 42a. A fourth side panel 44 is secured to the edge of top panel 40 opposite side panel 34 along fold line 43 and a closure flap 46 is secured to side panel 44 along fold line 45 parallel to fold lines 33 and 39. A precut U-shaped tab 47 is provided in panel 44 and a pair of T-shaped slots 48 are provided in closure flap 46. The crossbar of each slot is parallel to, and the leg of each slot is perpendicular to and intersects the transverse free edge 50 of flap 46. Support flaps 52 are connected to side panels 32 along fold lines 53 and support flaps 56 are connected to side panel 34 along fold lines 57.

A sheet 58 of textured-paper towel is provided on top of bottom panel 30 to provide heat insulation and also to protect polyethylene sheet 14 from wear by abrasion.

When box blank 12 is folded into a food package (as in FIG. 1), the gathered portion 15 of polyethylene sheet 14 extends through opening 38a and is turned back around the opening and sealed to the top of interior half-panels 36 between interior panels 36 and exterior panel 40 by Scotch brand Sand Blast Filler Type 02, manufactured by Minnesota Mining & Mfg. Co., precoated onto the top of half-panels 36.

Referring now to FIG. 2, a pair of primary electrodes 62 (tinned steel strip 0.01 inch thick and three-quarters inch wide) and four secondary electrodes 63 (aluminum strip 0.001 inch thick, 1⅜ inches wide, and 5 inches long) are heat-bonded with a thermoplastic adhesive to an insulating sheet 60 (paperboard 9 inches long and 7 inches wide) in parallel spaced-apart relationship with secondary electrodes 63 between primary electrodes 62. The space between adjacent secondary electrodes 63 is one-eighth inch; that between each primary electrode 62 and the adjacent secondary electrode 63 is one-fourth inch.

The entire length of each secondary electrode 63 is heat sealed to sheet 60. Each primary electrode 62 includes an inner portion (Including a horizontal section 66 bonded to sheet 60 and a vertical section 68 extending upwardly from sheet 60) within the enclosure formed by flexible sheet 14 and an outer portion 64 without sheet 14. A dimple 69 in vertical section 68 extends through a mating hole in sheet 14 into contact with a vertical section of outer portion 64. The two vertical sections are spot welded together at the dimple to provide electrical connection therebetween and a watertight seal through the sheet.

For connection to a source of electrical power, the outer portion 64 of each primary electrode includes a substantially U-shaped horizontal female connector 72 connected to the vertical section of the outer portion at right-angle bend 71. The tinned strip forming the lower portion of connector 72 is curved and includes, at its free end, a downwardly facing pointed tip 76.

When the food package is assembled, the outer portion 64 of each primary electrode 62 extends through the crossbar of one of the T-slots 48 in closure flap 46 (bend 71 engaging the slot), and connector 72 lies between closure flap 46 and bottom panel 30 with pointed tip 76 digging into the interior surface of bottom panel 30.

Deposits 80 (totaling 6 grams) of salt (Fine Prepared Flour Salt sold by the Diamond Crystal Salt Co.) are dispersed on insulating sheet 60 in all the spaces between adjacent pairs of electrodes 62 and 63. A sheet 82 of textured paper towel overlies the deposits to retain them in place between the electrodes.

In operation, to heat and, as required cook, the frozen food contained in food tray 16, circular portion 42 of exterior top panel 40 is removed, exposing opening 42a, about 8 ounces of water is introduced into the cavity formed by sheet 14 (through openings 42a and 38a), flowing over and around the polyethylene sheet 18 surrounding tray 16 onto insulating sheet 60. The water fills the cavity defined by polyethylene sheet 14 to a level just below the bottom of food tray 16 and dissolves salt 80 thereby forming a conductive aqueous or electrolytic solution. Sheet 14, with spacer 22, forms a pan for the conductive liquid and the openings 23 is spacer 22 permit flow of liquid horizontally therethrough to insure a substantially even liquid level. Primary electrodes 62 are then connected to an AC source (typically 110–120-volt, 60-cycle house current), causing current to flow through and heat to boiling the conductive aqueous solution. The steam thus produced surrounds, heats, and, as required, cooks the food in tray 16. Most of the steam, after performing some heating, condenses on the sheet 18 surrounding food tray 16 and on the top inside portion of sheet 14 and is returned as condensate to the boiling liquid pool below the food tray and between the electrodes. Some steam continually escapes through vent 38a. When enough water from the conductive solution has escaped (as steam), current flow through the solution rapidly decreases and finally stops altogether.

In practice, the cooking cycle includes an initial period of about 1 minute during which a high current (approximately 7–8 amps) is passed through the solution to rapidly heat it to boiling, a cooking period of 12-to 16-minutes duration during which a lower current (typically about 3 amps) is passed through the solution to cause it to continue to boil at a substantially constant rate, and a cutoff period during which both current flow and rate of boiling rapidly decrease. The cutoff period may be as long as 5 minutes if the water is permitted to boil off to the point where current flow completely ceases, but is generally shortened by disconnecting the package from the power source when, as shown by substantial decrease in the amount of steam from vent 38a, the current flow and cycle have entered the cutoff region.

During the initial period, high current is desired for rapidly heating the conductive solution to boiling. During the cooking period, a far lower current level is required simply to maintain the solution boiling but at a relatively low level so that the rate of water loss is not excessive. The current level during the cooking period depends on conductivity of the primary electrodes and conductive solution. The higher initial period current is provided by secondary electrodes 63.

During the initial period, current passes between principal electrodes 62 along a relatively low-resistance path including both the conductive solution and secondary electrodes 63. This high initial period current rapidly erodes away the secondary electrodes (which are very thin and of material having a higher negative electromotive potential than does the material of the primary electrodes) so that, by the end of the initial period, only a small portion (approximately one-fourth to one-half inch wide and indicated by the dashed outlines in FIG. 2) of each secondary electrode 63 remains. This erosion process effectively removes the secondary electrodes from the current path so that, during the cooking period, current must pass between primary electrodes along the higher resistance path extending almost entirely through the conductive solution. Thus, without any change whatever in the electric power source connected to the package, two different current levels, each at the desired time, are provided.

Other embodiments within the scope of the following claims will occur to those skilled in the art.

What is claimed is:

1. The method of heating an electrolytic solution comprising the steps of:
   placing at least three relatively spaced electrodes in direct contact with said solution;
   connecting at least two of said electrodes to a source of electrical power;
   passing electrical current between said two electrodes connected to said source along a path including said solution and at least one electrode which is not connected to said source;
   effectively removing said one electrode which is not connected to said source from said path after said solution has been heated to a desired extent; and,
   thereafter continuing to pass electrical current between said two electrodes which are connected to said source.

2. The method of claim 1 including the step of effectively removing said one electrode by a process of erosion.

3. The method of claim 2 wherein said one electrode is of a material having a higher negative electromotive potential than the material of another of said electrodes.

4. The method of heating an electrolytic solution comprising the steps of:
   placing at least three relatively spaced electrodes in direct contact with said solution so that the resistance between two of said electrodes along a first path including said solution and the third of said electrodes is substantially less than is the resistance between said two electrodes along a second path including said solution but not including said third electrode;
   connecting said two electrodes to a source of electrical power;
   passing electrical current between said two electrodes along said first path, said third electrode not being connected to said source;
   effectively removing said third electrode from said path after said solution has been heated to a desired extent; and,
   thereafter continuing to pass electrical current between said two electrodes.

5. The method of claim 4 wherein said one electrode is of substantially less thickness than are said two electrodes and is effectively removed from said path by a process of erosion.

6. The method of claim 5 wherein said one electrode is of material having a higher negative electromotive potential than the material of said two electrodes.

7. In apparatus for heating an electrolytic solution and including a pair of relatively spaced, longitudinally extending primary electrodes adapted for direct electrical connection to a source of power and at least one secondary electrode spaced from and electrically insulated from said primary electrodes whereby said secondary electrode is adapted for electrical connection to said primary electrodes and said source of power solely through a solution, that improvement wherein:
   said secondary electrode has a first dimension measured in a direction generally parallel to the direction of longitudinal extent of said primary electrodes,
   a second dimension measured in a direction generally parallel to a line extending between said primary electrodes, and
   a third dimension measured in a direction generally perpendicular to said line and said direction of longitudinal extent, each of said first and second dimensions being substantially greater than said third dimension,
   whereby when said electrodes are immersed in an electrolytic solution the resistance between said primary electrodes along a first path including said solution and said secondary electrode is substantially less than the resistance between said primary electrodes along a second path including said solution but not including said secondary electrode; and,
   said secondary electrode is effectively self-removable from said first path in response to the passage of current along said first path.

8. The apparatus of claim 7 wherein said secondary electrode is of material having greater negative electromotive potential than the material of at least one of said primary electrodes.

9. The apparatus of claim 7 wherein said secondary electrode is of less thickness than are said primary electrodes.

10. The apparatus of claim 9 wherein said secondary electrode is aluminum and said primary electrodes are steel.

11. An apparatus for heating an electrolytic solution comprising
   the apparatus of claim 7 in further combination with:
   a container whose inner surface defines an interior cavity; and,
   a food compartment disposed within said cavity, said electrodes being mounted within said cavity below and spaced from said food compartment.

12. The apparatus of claim 11 wherein said secondary electrode is of a material having greater negative electromotive potential than the material of said primary electrodes.

13. The apparatus of claim 11 wherein the thickness of said secondary electrode is not more than one-half the thickness of said primary electrodes.

14. The apparatus of claim 13 wherein said primary electrodes are steel and said secondary electrode is aluminum.

15. The apparatus of claim 11 including a sheet of electrically nonconductive material disposed within said cavity, and a plurality of relatively spaced secondary electrodes disposed intermediate said primary electrodes, said electrodes being secured to said sheet in parallel spaced-apart relationship and each of said secondary electrodes being of lesser thickness than, and of material of higher negative electromotive potential than the material of said primary electrodes.

16. The apparatus of claim 11 wherein said electrodes are secured, in parallel spaced-apart relationship, to a sheet of electrically nonconductive material disposed within said cavity and including deposits of an electrolyte disposed on said sheet intermediate adjacent pairs of said electrodes.

17. The apparatus of claim 16 wherein said electrolyte is salt.

18. The apparatus of claim 17 including a water-pervious sheet overlying said deposits for maintaining said deposits in position intermediate said electrodes.

19. The method of claim 4 wherein said electrodes are substantially parallel to each other, said third electrode is substantially rectangular in transverse cross section, and said third electrode is positioned with the major transverse dimension thereof substantially parallel to a line between said two electrodes.

20. The apparatus of claim 7 wherein said electrodes extend in directions substantially parallel to each other and said secondary electrode is substantially rectangular in transverse cross section.

UNITED STATES PATENT OFFICE
CERTIFICATE OF CORRECTION

Patent No. 3,604,891              Dated September 14, 1971

Inventor(s)            Milton Saul Cohen

It is certified that error appears in the above-identified patent and that said Letters Patent are hereby corrected as shown below:

Column 1, line 67, the letter "c" should be --thermal--;

Column 2, line 41, the word "(Including...)" should be --(including...)--.

Signed and sealed this 2nd day of May 1972.

(SEAL)
Attest:

EDWARD M. FLETCHER, JR.                ROBERT GOTTSCHALK
Attesting Officer                      Commissioner of Patents